(12) United States Patent
Sauer et al.

(10) Patent No.: US 6,252,862 B1
(45) Date of Patent: Jun. 26, 2001

(54) METHOD AND APPARATUS FOR ROUTING PACKET DATA IN A COMMUNICATIONS SYSTEM

(75) Inventors: John M. Sauer, Naperville; Paul Daniel Steinberg, Bartlett, both of IL (US)

(73) Assignee: Motorola, Inc., Schaumburg, IL (US)

(*) Notice: Subject to any disclaimer, the term of this patent is extended or adjusted under 35 U.S.C. 154(b) by 0 days.

(21) Appl. No.: 09/315,465

(22) Filed: May 20, 1999

(51) Int. Cl.[7] .................................................. H04J 13/00

(52) U.S. Cl. ............................................................ 370/331

(58) Field of Search .................................... 370/465, 466, 370/401, 395, 351, 352, 389, 441, 442, 335, 342, 320, 503, 509, 229, 231, 236, 252, 331, 332, 333, 341, 535, 537, 216; 340/825.44; 455/425, 426, 428, 421, 413, 412, 436, 437, 455; 379/219, 220, 225, 95.15, 95.09, 95.14, 95.24, 95.25

(56) References Cited

U.S. PATENT DOCUMENTS 5,809,020 * 9/1998 Buckest et al. ....................... 370/335

* cited by examiner

*Primary Examiner*—Dang Ton
(74) *Attorney, Agent, or Firm*—L. Bruce Terry; Mario Donato

(57) ABSTRACT

A method and apparatus for routing packet data in a communications system. The method includes receiving a first path packet at first node, the first path packet having a content, creating two packets having the content, sending the two packets via different paths to a second node, and creating an estimated packet including an estimate of the content in response to the two packets received at the second node. In addition, a method for providing soft handoff in a cellular communication system is provided, the method including receiving a first path packet at a first node, the first path packet having a content within the first node, creating two packets having the content, sending the two packets to a transmitter, transmitting the two packets via two different radio channels to a second node, and creating an estimated packet including an estimate of the content in response to the two packets received at the second node.

27 Claims, 4 Drawing Sheets

METHOD AND APPARATUS FOR ROUTING PACKET DATA IN A COMMUNICATIONS SYSTEM

RELATED APPLICATIONS

The following applications are related to this application and are filed on the date herewith. The disclosure of each of these related applications is incorporated by reference: Ser. No. 09/315,277, filed May 20, 1999 titled "METHOD FOR CHANGING COMMUNICATION IN A COMMUNICATION SYSTEM, AND COMMUNICATION SYSTEM THEREFOR"; Ser. No. 09/315,696, filed May 20, 1992, now U.S. Pat. No. 6,192,037 titled "METHOD FOR ESTABLISHING COMMUNICATION IN A PACKET NETWORK"; Ser. No. 09/314,908, filed May 20, 1999, titled "METHOD FOR RETRANSMITTING A DATA PACKET IN A PACKET NETWORK"; Ser. No. 09/315,314, filed May 20, 1999, titled "COMMUNICATION NETWORK METHOD AND APPARATUS"; Ser. No. 09/315,467, filed May 20, 1999, titled "METHOD AND SYSTEM FOR PROCESSING INTELLIGENT NETWORK COMMANDS IN A COMMUNICATIONS NETWORK"; Ser. No. 09/315,653, filed May 20, 1999, titled "METHOD AND SYSTEM FOR NETWORK SERVICE NEGOTIATION IN A TELECOMMUNICATIONS SYSTEM"; Ser. No. 09/315,309, filed May 20, 1999, titled "SESSION BASED BILLING IN A COMMUNICATION SYSTEM"; Ser. No. 09/315,466, filed May 20, 1999, titled "METHOD AND SYSTEM FOR INTRODUCING NEW SERVICES INTO A NETWORK".

FIELD OF THE INVENTION

The present invention relates generally to a communications system, and more particularly, to a method and apparatus for routing data within the communications system. Still more particularly, the present invention relates to a method and apparatus for increasing the quality of a network transmission between a first node a second node, and a method for providing soft handoff in a cellular communications system.

BACKGROUND OF THE INVENTION

In a conventional telecommunications switching network, a communications path must be established in a source node and a destination node before data, such as facsimile, email, or voice, can be distributed along the established path. A propagation delay occurs across the network when setting up and releasing a communication path. Conventional telecommunications switching systems, upon deriving a destination of a telephone call, must send a message to a remote database system to request routing information for a particular call. Remote database systems provide a menu of routing information, and routing information is selected from the database system according to the request from a telecommunications switching system.

Code division multiple access (CDMA) systems must support the transport of digitally encoded information that is in packet form. In addition, CDMA systems must support multiple duplicated streams of this information, known as soft handoff, and carry this information in an efficient manner over transport links within the system. Large CDMA systems may require different networking technology. Implementation of an Internet Protocol (IP) based network can solve transparency issues with the network by providing the inter networking function above the physical and transport network layers. The cost of network equipment in a CDMA system is a problem because of the large number of network paths required because of the use of soft handoff. Another problem with the large number of network paths in a CDMA system is the complexity of manipulation and management of these paths in a connection oriented implementation. IP allows a connection less or routed architecture that greatly simplifies network implementation. Unlike other technologies such as Asynchronous Transfer Mode (ATM), the use of differentiated services to assign and/or control quality of service (QoS) enables this to be done in a connectionless manner in the core network where bandwidth is prevalent.

In addition, a routed network enables a peer-to-peer network element relationship rather than the classical hierarchical network. A peer-to-peer network allows for entity relationships such as client/server which offers improved and flexible possibilities for scalability and network robustness.

It is, therefore, desirable to have an improved method and apparatus for routing packet data in a communications system, wherein the quality of a network transmission between a first node and a second node is increased.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF THE INVENTION

Figure 1:
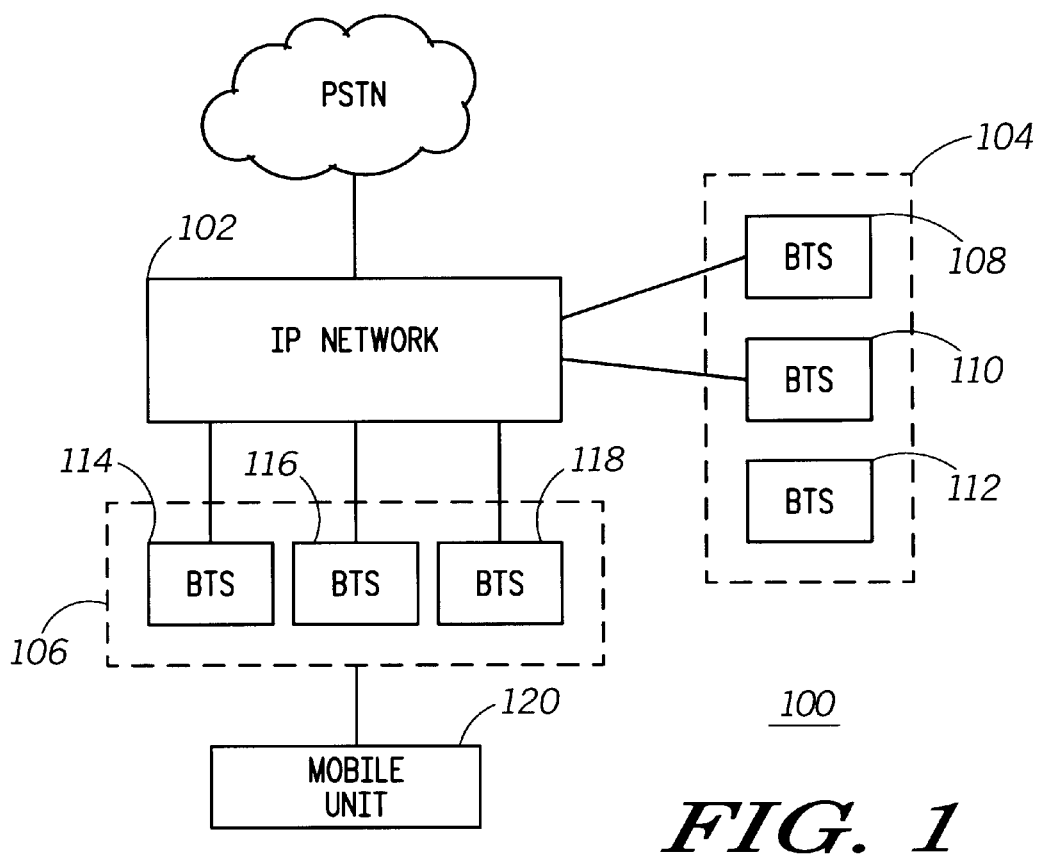
FIG. 1 depicts a block diagram of a communications system in which the present invention may be implemented.

With reference now to the figures, and in particular with reference to FIG. 1, a communications system 100 is depicted in which the present invention may be implemented. Communications system 100 includes an interconnect network, which may be a packet system but which in the preferred embodiment is an IP network which processes data streams from various sources, such as voice, data, image, and video. IP network 102 receives and sends data to and from cellular regions 104 and 106. Cellular region 104 includes base termination sites (BTSs) 108–112, which send and receive radio signals to and from mobile telephones and packetize the communications content of the radio signals into electronic data transported within data packet units. The packets are sent to IP network 102 over the span lines connecting BTSs 108–112. These span lines may be T1 or E1 lines connecting the BTS to IP network 102. Similarly, cellular region 106 contains BTSs 114–118, which also receive radio signals, packetize these signals into data packet units, and send the data packet units to IP network 102 over the span lines connecting BTSs 114–118 to IP network 102.

Data can be sent to mobile telephone units, such as mobile unit 120, from IP network 102 through transmissions from BTSs located in each of the cellular regions. A mobile unit 120 traveling within cellular region 106 transmits radio signals for a call that may be received by more than one BTS, such as BTSs 116 and 118. Each BTS receiving a radio signal from mobile unit 120 will transmit data to IP network 102, via the span lines. At some point, only one of the two BTSs will receive radio signals from the mobile unit 120 because the mobile unit 120 will have traveled out of the range of that BTS. Similarly, a mobile unit may receive a radio signal from more than one BTS depending on the location of mobile unit 120. This receiving of radio signals at multiple BTSs for a signal call is associated with soft handoff (SHO).

Figure 2:
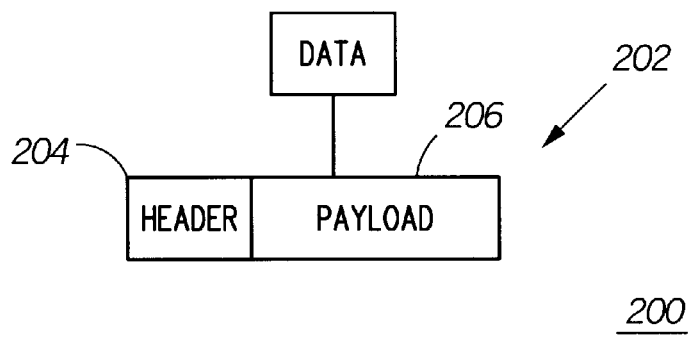
FIG. 2 depicts a block diagram of data structures according to the present invention used to transfer data within a communications system.

With reference now to FIG. 2, a block diagram of data structures used to transfer data in communications system 100 in FIG. 1 is depicted according to the present invention. Packet 200 is an electronic data packet in the form of a code division multiple access (CDMA) packet received within one of the BTSs shown in FIG. 1, such as BTS 118. Packet 200 includes data streams associated with CDMA. When received at BTS 118, packet 200 is transformed into a packet data unit (PDU) 202. PDU 202 is sent to IP network 102. PDU 202 is an example of the data structure used within IP network 102 to carry data from source nodes to destination nodes. PDU 202 comprises a content which includes a header portion 204 and, a payload portion 206. Header portion 204 includes information used to route the PDU 202 along with other overhead information. Data is placed within payload portion 206.

Figure 3:
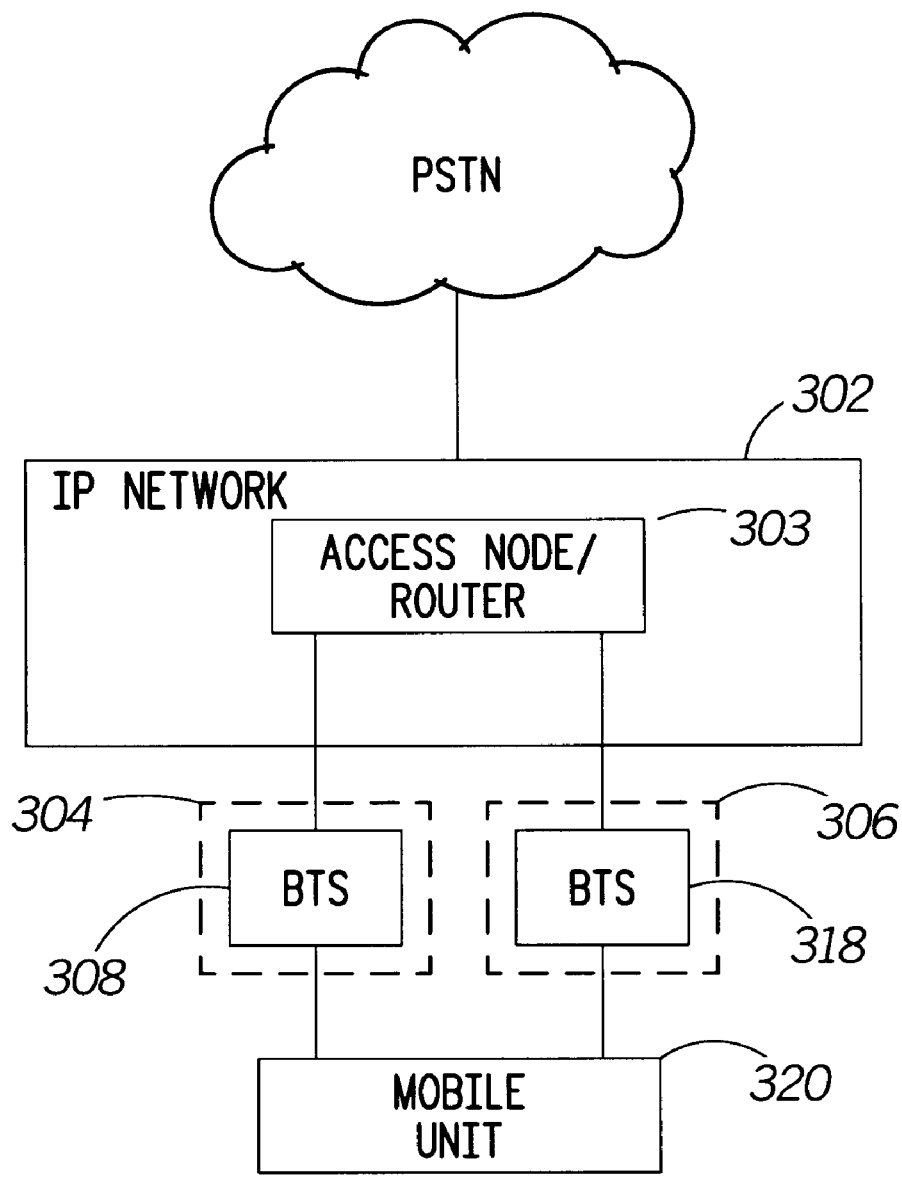
FIG. 3 depicts a block diagram of an embodiment of the present invention.

With reference now to FIG. 3, a communications system 300 is depicted in which the present invention may be implemented. Communications system 300 includes an IP network 302 which processes data streams from various sources, such as voice, data, image, and video. IP network 302 receives and sends data to and from cellular regions 304 and 306. IP network 302 includes access node/router 303, which sends and receives data streams to and from base termination sites 308 and 318. Cellular region 304 includes base termination site (BTS) 308, which sends and receives radio signals to and from mobile telephones and packetizes the communications content of the radio signals into electronic data transported within data packet units. The packets are sent to IP network 302 over the span lines connecting BTSs 308 and 318. Alternatively, the packets may be sent over fiber, microwave, etc. Similarly, cellular region 306 contains BTS 318, which also receives radio signals, packetizes signals into data packet unit, and sends the data packet units to IP network 302 over the span lines connecting BTS 318 to IP network 302. With regard to downlink traffic, access node/router 303 receives an incoming data stream from a node within IP network 302, the data stream having a content including a header portion and a payload portion. Within node 303, two packets are created having the content, one of the packets being sent to BTS 308 and the other of the packets being sent to BTS 318. In the preferred embodiment, the two packets are transmitted via two different logical channels over a shared broadband spectrum to a second node, which, as shown in FIG. 3, is mobile unit 320. At mobile unit 320, an estimated packet is created having an estimate of the content in response to the two packets received from BTS 308 and BTS 318. In a CDMA system, the creation of an estimated packet includes aligning the packets received from BTS 308 and BTS 318, and summing the packets received from BTS 308 and BTS 318. In an alternate embodiment, a quality of service (QoS) function may be added, the QoS function being described in more detail below.

Figure 4:
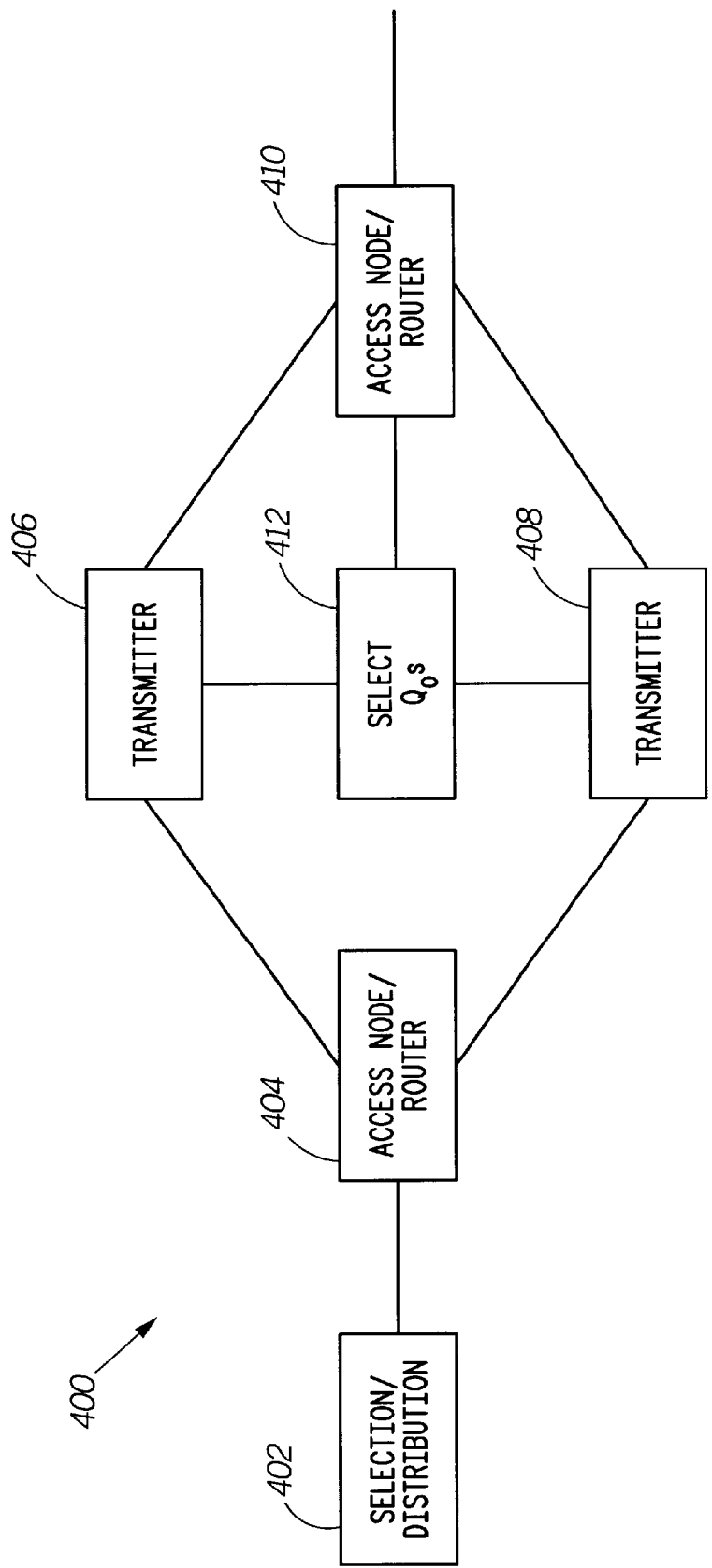
FIG. 4 depicts a block diagram of an alternate embodiment of the present invention.

Referring to FIG. 4, a block diagram of an alternate embodiment of the present invention is shown at 400, wherein access node/router 404 receives an incoming data stream from selection/distribution node 402, the data stream having a content. Within node 404, the data packet is replicated, whereby two packets are created having the content, one of the packets being sent to transmitter 406 and the other of the packets being sent to transmitter 408. Subsequently, the replicated packet is sent or transmitted to node 410. At node 410, an estimated packet is created having an estimate of the content in response to the two packets received from transmitters 406 and 408. In an alternate embodiment, a quality of service function 412 may be added, the quality of service function 412 providing a mechanism to weigh the cost of resources and the system availability of resources. This facilitates the decision to maintain or remove one or more of the multiple paths being used in the network connection between nodes 404 and 410. For example, a decision can be made about the quality of each of the multiple paths, thereby enabling one of the paths to be selected over another one of the paths or even enabling one of the paths to be torn down.

Figure 5:
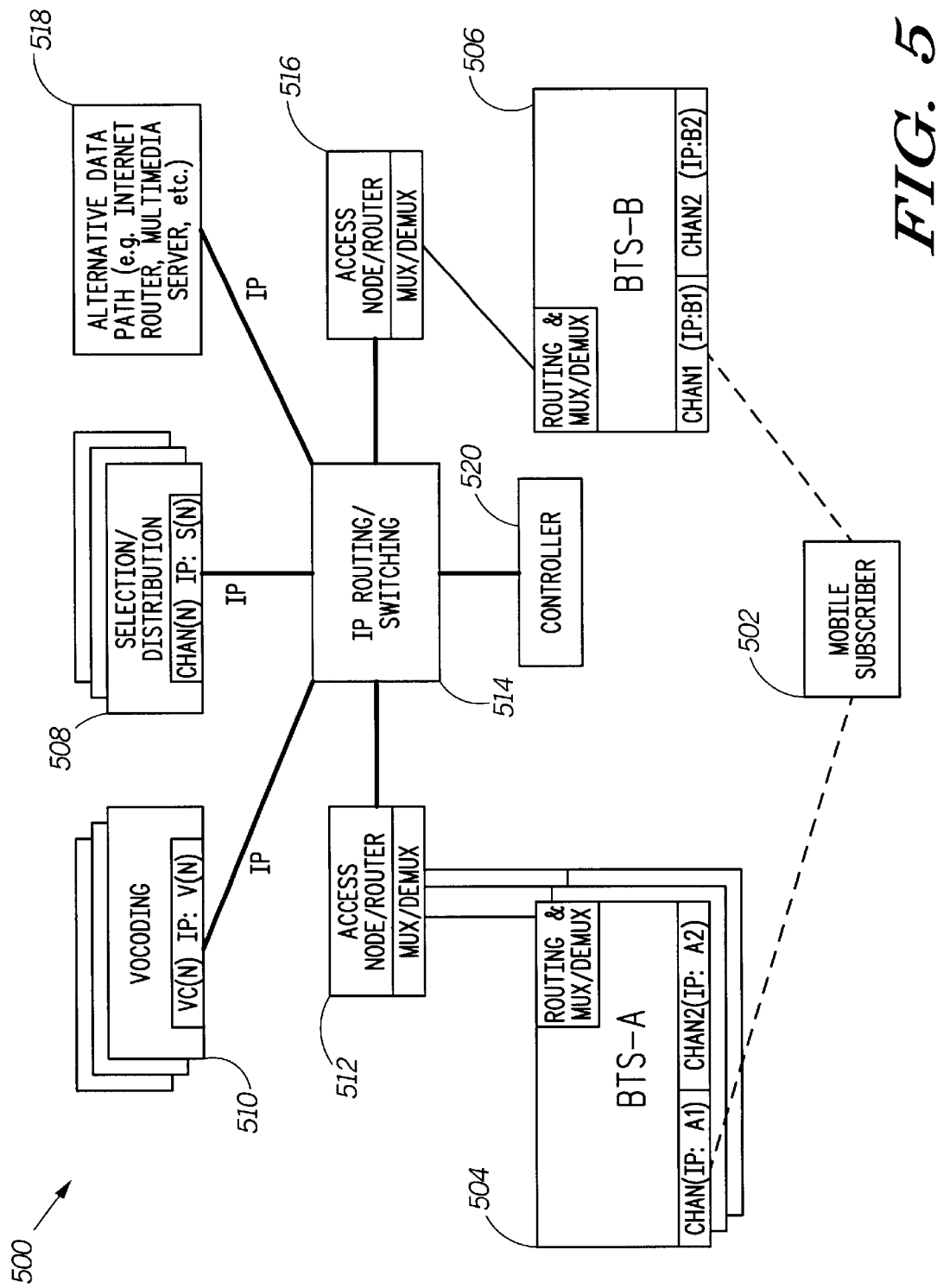
FIG. 5 depicts a more detailed block diagram of an embodiment of the present invention as it relates to a CDMA system.

With reference now to FIG. 5, a block diagram of an embodiment of the present invention as it relates to a CDMA system is shown wherein soft handoff with paths including BTS-A and BTS-B is shown. As seen in FIG. 5, in the preferred embodiment, each physical bearer end point will be individually IP addressable. For example, in BTS-A 504, channel 1 has the IP address IP:A1, channel 2 has the IP address IP:A2, etc. In BTS-B 506, channel 1 has the IP address IP:B1, channel 2 has the IP address IP:B2, etc. Referring to the selector 508, the address for channel (N) is IP:S(N). Referring to the vocoder 510, the IP address of vocoder (N) is IP:V(N). Traffic is routed among the physical elements via standard IP routing and, in the preferred embodiment, by a connectionless IP protocol such as UDP for transport of bearer traffic. For example, uplink traffic (e.g., BTS to vocoder) is routed as follows:

channel element BTS-A-1 to selector channel 1 (source IP address IP:A1, destination IP address IP:S1)

channel element BTS-B-1 to selector channel 1 (source IP address IP:B1, destination IP address IP:S1)

selector channel 1 to vocoder 1 (source IP address IP:S1, destination IP address IP:V1)

The reverse is generally true for the downlink except that in the preferred embodiment, IP multicast such as Internet Group Management Protocol (IGMP) is used to allow the distribution function to provide a copy of an incoming sample stream to each of the multiple BTSs involved in soft handoff. In this case, channel element BTS-A-1 (IP:A1) and channel element BTS-B-1 (IP:B1) belong to a common multicast group that the distribution function (selector channel 1) sends to. As the call configuration changes, soft handoff legs add and drop, and BTS channel elements enter and leave the multicast group, respectively.

Referring back to FIG. 5, the following description pertains to tracing the voice path through the system 500 for the downlink. Voice will flow from the PSTN (not shown) to vocoder 510. An alternative flow may be from the internet or other multimedia device through unit 518 and then to selection/distribution unit 508. Voice can be carried by that path as well (e.g., voice over IP). The voice stream thereafter gets fed over to the selection/distribution unit 508. More particularly, the voice stream flows out the IP path coupling vocoder 510 and IP routing/switching unit 514 and thereafter gets routed to selection distribution unit 508. In other words, the voice stream is essentially an IP datagram that is routed to a specific selection/distribution unit that is handling this particular call. The data packet is thereafter replicated via IGMP in one of the access node/routers 512, 516 or IP routing/switching unit 514.

IP routing/switching unit 514 and access nodes 512, 516 essentially provide media adaptation and IP datagram routing. IP routing/switching unit 514 in essence just takes in an IP datagram and routes it. Access nodes or routers 512, 516 typically bring in a plurality of fairly low speed links such as T1 and multiplexes those at that point.

Subsequently, the replicated packet is sent via different paths to BTS-A 504 and BTS-B 506. Thereafter, each of the BTSs 504 and 506 will take the payload out of the packet and convert the payload into a form that is suitable for wireless transmission and thereafter transmit the packet in a synchronized fashion or a timed aligned fashion to the mobile subscriber unit 502. It should be noted that the same flow as described above for a voice path could occur for data such as data off of the internet or a multi-media service as shown at alternative data path unit 518.

It is contemplated that the mobile subscriber 502 itself be the IP capable end point. In that instance, mobile subscriber 502 is then the multicast group and the BTSs 504 and 506 then act as multicast routing proxies as members of the IP network. As a mobile moves (hands off) from one BTS to another, the multicast routing tree is updated as other BTSs get involved and/or leave the call.

IP multicast via a protocol such as internet group management protocol (IGMP) can also be used to distribute control messages, such as mobile paging requests, from a central control function such as controller 520 to the BTSs 504 and 506. For example, each paging area may correspond to a unique multicast group. BTSs that belong to a given paging area would join the multicast group associated with that area. Each BTS may be a member of multiple paging areas and thus would belong to multiple multicast groups. To deliver a page, the controller 520 would send a page control message to the multicast group associated with the paging area to be paged. Only the BTSs that need to actually page the subscriber will receive the page control message. Simple broadcast can also be used for this function or when the page is effectively a "page all" request. The aforementioned also may be applied to realize other features such as short message service (SMS).

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for increasing the quality of a network transmission between a first node and a second node, wherein the first and second nodes are coupled via two paths, comprising the steps of:
   receiving a first path packet at the first node, the first path packet having a content;
   creating two packets having the content;
   sending the two packets via different paths to the second node; and
   creating an estimated packet including an estimate of the content in response to the two packets received at the second node.

2. A method as recited in claim 1, wherein the first packet comprises an IP multicast packet.

3. A method as recited in claim 1, wherein the second node is a wireless CDMA unit.

4. A method as recited in claim 3, wherein the step of creating an estimated packet further comprises:
   aligning the two packets; and
   summing the two packets.

5. A method as recited in claim 3, wherein the wireless unit comprises an IP capable endpoint.

6. A method as recited in claim 1, wherein the step of creating an estimated packet further comprises selecting one of the packets.

7. A method as recited in claim 1, wherein the estimated packet is created based upon the relative quality of the packets.

8. A method as recited in claim 1, wherein the paths include a wireless transmission portion.

9. A method as recited in claim 1, including the step of translating one of the two packets from one of a first media to a second media and a first medium to a second medium.

10. A method as recited in claim 1, wherein the step of sending comprises sending each of the two packets to an intermediate mode.

11. A method as recited in claim 10, wherein the intermediate node is a transmitter.

12. A method as recited in claim 1, including the steps of:
   associating a multicast group with a paging area; and
   delivering a page control message to the multicast group associated with the paging area to be paged.

13. A method for providing soft handoff in a cellular communication system, comprising the steps of:
   receiving a first path packet at a first node, the first path packet having a content;
   within the first node, creating two packets having the content;
   sending the two packets to a transmitter;
   transmitting the two packets via two different radio channels to a second node; and
   creating an estimated packet including an estimate of the content in response to the two packets received at the second node.

14. A method as recited in claim 13, wherein the first packet comprises an IP multicast packet.

15. A method as recited in claim 13, wherein the second node is a wireless CDMA unit.

16. A method as recited in claim 15, wherein the step of creating an estimated packet further comprises:
   aligning the two packets; and
   summing the two packets.

17. a method as recited in claim 15, wherein the wireless unit comprises an IP capable endpoint.

18. A method as recited in claim 13, wherein the step of creating an estimated packet further comprises selecting one of the packets.

19. A method as recited in claim 13, wherein the estimated packet is created based upon the relative quality of the packets.

20. A method as recited in claim 13, wherein the paths include a wireless transmission portion.

21. A method as recited in claim 13, including the step of translating one of the two packets from one of a first media to a second media and a first medium to a second medium.

22. A method as recited in claim 13, wherein the step of sending comprises sending each of the two packets to an intermediate mode.

23. A method as recited in claim 22, wherein the intermediate node is a transmitter.

24. A method as recited in claim 13, including the steps of:

associating a multicast group with a paging area; and delivering a page control message to the multicast group associated with the paging area to be paged.

25. A method as recited in claim 13, wherein the step of transmitting includes the step of transmitting via two different logical channels over a shared broadband spectrum.

26. A system for increasing the quality of a network transmission between a first node and a second node, wherein the first and second nodes are coupled via two paths, comprising:

means for receiving a first path packet at the first node, the first path packet having a content;

means for creating two packets having the content;

means for sending the two packets via different paths to the second node; and means for creating an estimated packet including an estimate of the content in response to the two packets received at the second node.

27. A system for providing soft handoff in a cellular communication system, comprising the steps of:

means for receiving a first path packet at a first node, the first path packet having a content;

within the first node, means for creating two packets having the content;

means for sending the two packets to a transmitter;

means for transmitting the two packets via two different radio channels to a second node; and means for creating an estimated packet including an estimate of the content in response to the two packets received at the second node.

\* \* \* \* \*